US012490036B2

(12) United States Patent
Kunkati et al.

(10) Patent No.: US 12,490,036 B2
(45) Date of Patent: Dec. 2, 2025

(54) OPERATING PUBLIC ADDRESS SYSTEMS WITH IP-BASED AMPLIFIERS

(71) Applicant: Honeywell International Inc., Charlotte, NC (US)

(72) Inventors: Suneel Kunkati, Bangalore (IN); Rajagopal Palanivelu, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 237 days.

(21) Appl. No.: 17/950,463

(22) Filed: Sep. 22, 2022

(65) Prior Publication Data

US 2024/0107245 A1 Mar. 28, 2024

(51) Int. Cl.

*H04R 27/00* (2006.01)
*H04R 1/40* (2006.01)
*H04R 3/12* (2006.01)

(52) U.S. Cl.

CPC ............. *H04R 27/00* (2013.01); *H04R 1/403* (2013.01); *H04R 3/12* (2013.01); *H04R 2227/003* (2013.01); *H04R 2420/07* (2013.01)

(58) Field of Classification Search

None
See application file for complete search history.

(56) References Cited

U.S. PATENT DOCUMENTS 9,538,011 B1 * 1/2017 Sherman ............... H04L 65/403
9,883,046 B1 * 1/2018 LaBosco ............. H04M 1/0291
11,202,146 B1 * 12/2021 Zoehner .................. H04L 65/75
11,652,503 B2 * 5/2023 Girardi ...................... H04L 5/14 370/329
2005/0177256 A1 8/2005 Shintani
2014/0241533 A1 * 8/2014 Gerrish .................. H04R 27/00 340/517
2015/0105118 A1 * 4/2015 Tapia ..................... H04R 27/00 455/521
2015/0163609 A1 * 6/2015 Mahasenan ......... H04L 12/1895 381/82

(Continued)

FOREIGN PATENT DOCUMENTS

CN 206575425 U 10/2017
CN 209057352 U * 7/2019

(Continued)

OTHER PUBLICATIONS

Honeywell, "X-618 Public Address and Voice Alarm System". pp. 1-50. https://hbtmkto.honeywell.com/rs/127-UCB-316/images/Honeywell_X-618_Product_ManualV1.pdf (Year: 2018).*

(Continued)

*Primary Examiner* — Qin Zhu
(74) *Attorney, Agent, or Firm* — Brooks, Cameron & Huebsch, PLLC

(57) ABSTRACT

Devices, systems, and methods for operating public address systems with IP-based amplifiers are described herein. In some examples, one or more embodiments include a computing device, and a public address system of a facility, comprising a plurality of speakers, an amplifier connected to the plurality of speakers, and a controller wirelessly connected to the amplifier, wherein the controller is configured to cause the plurality of speakers to play audio.

16 Claims, 4 Drawing Sheets

(56) References Cited

U.S. PATENT DOCUMENTS

| | | | | |
|---|---|---|---|---|
| 2018/0139330 | A1* | 5/2018 | LaBosco | H04R 27/00 |
| 2018/0374493 | A1* | 12/2018 | Usui | G10L 19/173 |
| 2019/0238683 | A1* | 8/2019 | LaBosco | H04R 27/00 |
| 2020/0396540 | A1 | 12/2020 | Ehlert | |

FOREIGN PATENT DOCUMENTS

| | | | | | |
|---|---|---|---|---|---|
| GB | 2511703 | A | * | 9/2014 | H04R 27/00 |
| GB | 2607973 | A | * | 12/2022 | H04R 27/00 |
| KR | 101804179 | B1 | * | 1/2018 | |
| KR | 102296925 | | | 9/2021 | |
| KR | 102296925 | B1 | * | 9/2021 | |
| KR | 20220141188 | A | * | 10/2022 | |
| WO | WO-2013128147 | A1 | * | 9/2013 | H04R 27/00 |

OTHER PUBLICATIONS

Digital Acoustics LLC; "IP Amplifiers"; Accessed: Dec. 22, 2021 (2 pgs) https://www.digitalacoustics.com/ip-amplifiers/.

Technomad; "PowerChiton™ Weatherproof Outdoor Amplifiers"; Accessed: Dec. 22, 2021 (6 pgs) https://www.technomad.com/products/powerchiton/.

* cited by examiner

OPERATING PUBLIC ADDRESS SYSTEMS WITH IP-BASED AMPLIFIERS

TECHNICAL FIELD

The present disclosure relates to devices, systems, and methods for operating public address systems with IP-based amplifiers.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system can include a public address system which can amplify and emit noises. Such noises may include human voices, pre-recorded messages, alarms, tones, and/or other audible sounds. The public address system can utilize microphone(s), amplifier(s), speaker(s), and/or other devices to emit such audible sounds. Additionally, while the public address system can emit noises in an emergency situation, the public address system can also emit noises to perform announcements, play music, and/or be utilized for any other purpose. Such a public address system can be sufficiently audible at a distance and/or over a large area, especially in an emergency situation.

DETAILED DESCRIPTION

Figure 1:
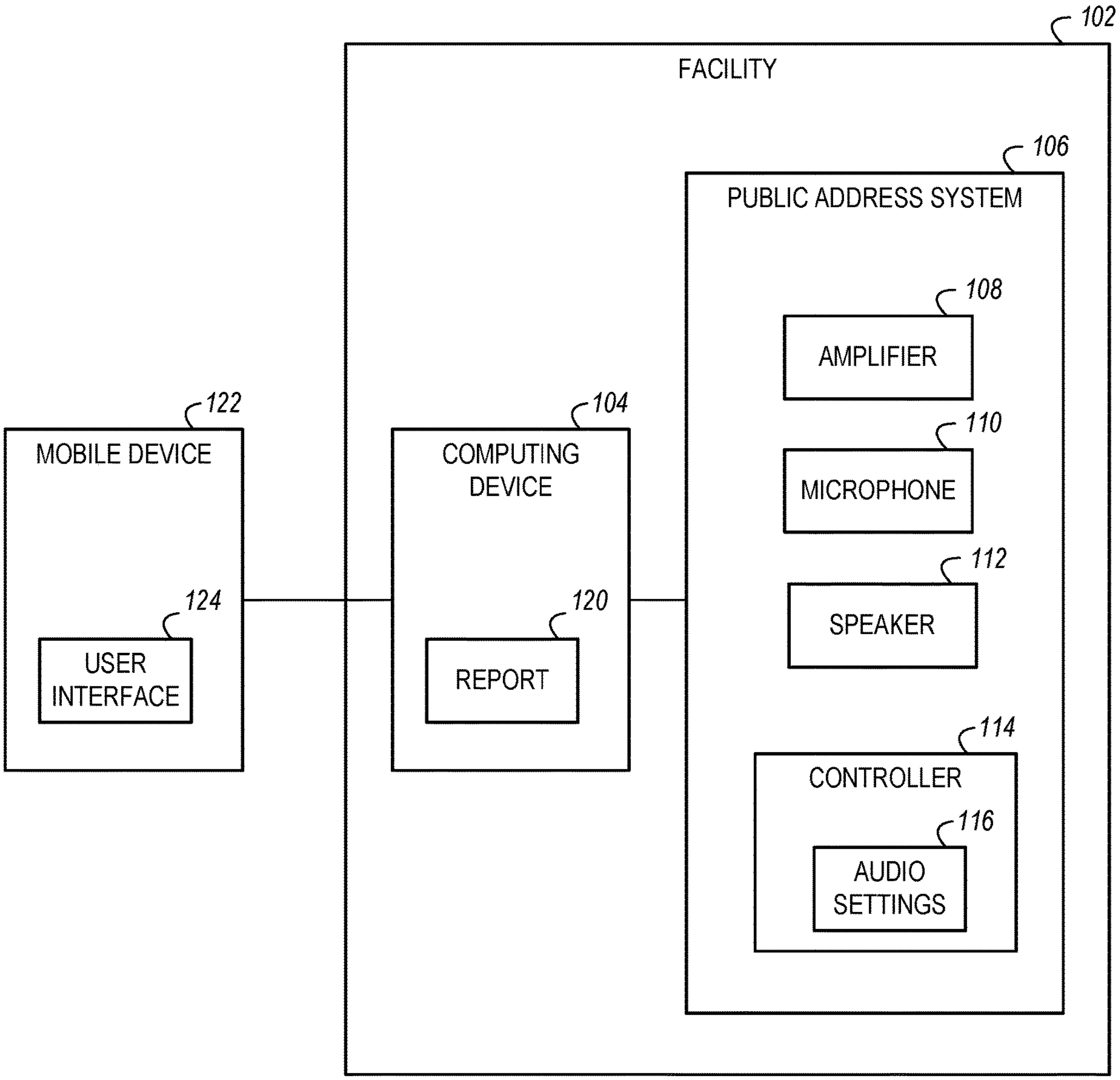
FIG. 1 is an example of a system for operating public address systems with IP-based amplifiers, in accordance with one or more embodiments of the present disclosure.

Devices, systems, and methods for operating public address systems with IP-based amplifiers are described herein. In some examples, one or more embodiments include a computing device, and a public address system of a facility, comprising a plurality of speakers, an amplifier connected to the plurality of speakers, and a controller wirelessly connected to the amplifier, wherein the controller is configured to cause the plurality of speakers to play audio.

In previous approaches, a controller of a public address system may be internet protocol (IP)-enabled, but that may be the only device of the public address system that is IP-enabled. Accordingly, controllers of previous approaches are typically physically wired to amplifiers, which may be stacked in racks near (e.g., in the same room as) the controller(s). The amplifiers can each include circuits which are wired to field devices (hereinafter referred to as "speakers"). The amplifiers of previous approaches, being located near the controller, are typically located far from the speakers, especially in high rise buildings and/or in facilities with multiple zones, groups, and/or sectors. The costs involved in previous approaches include decibel loss, signal attenuation, and increased labor costs involved in installation and/or maintenance of these long wirings.

Embodiments of the present disclosure include IP-based amplifiers that can securely and wirelessly connect to controllers. As a result, amplifiers in accordance with embodiments herein can be installed on each floor and/or zone, much closer to the speakers than in previous embodiments. In an example, an installer need not run wires from amplifiers in a first floor cabinet of a high rise building to speakers on each of its 60 floors. Instead, the amplifiers can be installed on the floors and/or zones where the speakers are and the wiring can be reduced to the much shorter distances between the local amplifiers and speakers.

In an event in which a public address system is utilized, an input is received which causes noise to be audibly output. For example, an event can cause a pre-recorded message to be amplified and transmitted to speakers for the speakers to audibly emit the pre-recorded message. In another example, a user may provide an input by speaking into a microphone, and the spoken message from the user can be received by the microphone, amplified, and transmitted to speakers for the speakers to audibly emit the spoken message from the user.

Some facilities may include logical expressions configured to cause the public address system to take actions. For example, in response to an event occurring, such as a fire, the public address system may take predefined actions defined according to logical expressions, such as sending a particular message for emission in one location and sending a different message for emission in another location. For example, if the facility includes five floors, a message can be sent to speakers on the fifth-floor detailing to occupants of the fifth floor how to evacuate and why, whereas a different message can be sent to speakers on the fourth-floor detailing to occupants of the fourth floor how to evacuate and why. Such messages may differ as different evacuation routes may exist for different floors/areas of a facility.

Public address systems can be commissioned (e.g., when they are installed). Commissioning, as referred to herein, is the process of assuring that all systems and components of a public address system are designed, installed, tested, operated, and maintained according to the operational requirements of the facility (e.g., owner or final client). Commissioning can include verifying that the audio played by the speakers in a facility is audible and/or intelligible. Stated differently, commissioning can include verifying and/or ensuring that values of various parameters of the audio played by the speakers of a facility (referred to herein as "audio parameters") meet or exceed target values. Audio parameters are known to those of skill in the art and can refer, for example, to volume, frequency, bandwidth, pitch, filter cutoff frequency, etc.

In previous approaches, commissioning a public address system can be laborious, time consuming, and costly. For instance, in large facilities, such as airports, an acoustic simulation report may be obtained (e.g., from a third party). Based on this report, speaker and/or controller audio settings can be determined. In some instances, sound pressure level can be determined. In small and/or medium-sized facilities the cost of these steps may be prohibitive. Instead, in order to determine whether the system performs as configured, a first technician may travel throughout the facility with a communications device (e.g., a walkie talkie) while a second technician operates a controller and/or computing device that causes audio to be played by the various speakers. In some cases, each speaker may be tested individually, one by one. The quality of the audio played by the different speakers is communicated from the first technician back to the second technician. Adjustments can be made by the second technician based on the feedback received from the first technician. This approach is time-consuming and involves multiple technicians and their associated costs.

Embodiments of the present disclosure can reduce (e.g., eliminate) the need for multiple technicians and save time and money. For example, in some embodiments, the speakers of a public address system can include microphones. These microphones can record the audio played by the speakers in a facility. The recorded audio from the different zones of the facility can be analyzed by a computing device. In some embodiments, audio parameters of the recorded audio can be displayed (e.g., via graphs, charts, etc.). In some embodiments, audio settings can be automatically adjusted by the computing device. In some embodiments, audio settings may be adjusted manually based on information provided by the computing devices. For example, the computing device can make recommendations associated with adjusting audio settings.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for operating public address systems with IP-based amplifiers, in accordance with one or more embodiments of the present disclosure. The system 100 can include a facility 102, a computing device 104, a public address system 106, and a mobile device 122.

As mentioned above, a facility 102 can be a building, a campus (e.g., building(s) with outdoor spaces), etc. and can include a public address system 106. As used herein, the term "public address system" refers to an electronic system to cause noise to be audibly output. The public address system 106 can be utilized at the facility 102 in order to amplify and emit audible noises, including pre-recorded messages, alarms, tones, and/or other audible sounds. Such audible noises may be emitted during an event, such as a public address, an emergency situation, etc. The facility 102 can be a building with many floors, sectors, and/or zones, in some embodiments.

The public address system 106 can include components to emit such audible noises, including an amplifier 108, microphone 110, and speaker 112. As used herein, the term "amplifier" refers to an electronic device that is configured to increase the power of an electrical signal. For example, the signal can be an audio signal that is to be emitted into the facility 102. As used herein, the term "microphone" refers to an electronic device that converts sound into an electrical signal. As used herein, the term "speaker" refers to an electronic device that converts an electrical signal into audible sound. In some examples, the microphone 110 can convert sound, such as audio played by the speaker 112, into an electrical signal that can be processed by the computing device 104. In some examples, the microphone 110 can convert sound, such as a speaker's voice, into an electrical signal that can be amplified via the amplifier 108 and audibly emitted to the facility 102 via the speaker 112. In some examples, the amplifier 108 can amplify an electrical signal corresponding to a pre-recorded message or sound that can be audibly emitted to the facility 102 via the speaker 112. Such emission of voice and/or pre-recorded messages/sounds are further described herein.

Although the public address system 106 is illustrated in FIG. 1 as including a single amplifier 108, a single microphone 110, and a single speaker 112, embodiments of the present disclosure are not so limited. For example, the public address system 106 can include multiple amplifiers 108, multiple microphones 110, and/or multiple speakers 112.

As mentioned above, the public address system 106 can perform actions when an event occurs in the facility. As used herein, the term "event" refers to an occurrence. An event can be, for example, a non-emergency event (e.g., an announcement), an emergency event (e.g., a fire or other emergency), among other types of events.

As illustrated in FIG. 1, the public address system 106 can include a controller 114. The controller 114 is configured to cause the public address system 106 to perform predefined actions during an event. In an example in which the event is an emergency event (e.g., a fire), the controller 114 can cause the public address system 106 to emit instructions on where and how to evacuate the facility 102 (e.g., via the speaker 112), emit warning tones (e.g., via the speaker 112), among other predefined actions.

In some examples, the event can be a fire. Causing the controller 114 to perform the predefined actions can include causing the speaker 112 to output a pre-recorded message. For example, the controller 114 can cause the speaker 112 to output a first pre-recorded message on a first floor of the facility 102 (e.g., "Proceed to nearest exit"), cause another speaker in the facility 102 to output a second pre-recorded message on a second floor of the facility 102 (e.g., "Proceed to east stairwell and move down one floor, exit facility from emergency exit"), etc. Although the event types are described above as being an emergency event (e.g., a fire) and an announcement, embodiments of the present disclosure are not so limited. For example, the event can be any other event.

The controller 116 can include audio settings 116. The audio settings 116 can include settings for various parameters of played audio known to those of skill in the art including volume, frequency, bandwidth, pitch, filter cutoff frequency, etc. The audio settings can be adjusted manually (e.g., via user input) and/or automatically (e.g., without user input).

As illustrated in FIG. 1, the audio settings 116 can be stored at the controller 114. For example, the audio settings 116 can be stored in memory (e.g., not illustrated in FIG. 1) of the controller 114, and a processor associated with the controller 114 can execute instructions to cause the public address system 106 (e.g., speakers 112 of the public address system 106) to exhibit the audio settings, as described above. However, embodiments of the present disclosure are not so limited to storing the audio settings 116 locally at the controller 114. For example, the audio settings 116 may be stored remotely at the computing device 104, remotely at a remote computing device (e.g., not illustrated in FIG. 1) such as a cloud server, and may be accessed by the controller 114 via a network relationship between the controller 114 and the remote computing device, etc.

As illustrated in FIG. 1, the facility 102 can include a computing device 104. The computing device 104 can access the public address system 106 in the facility 102. For example, the computing device 104 can connect, via a network relationship, to the controller 114 to view and/or modify the audio settings 116. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

An audio file (sometimes referred to herein simply as "audio") can be communicated to the controller 114 from the computing device 104. The controller 114 can cause the audio to be played by the speaker 112. The played audio can be received by the microphone 110, which can convert the audio to an electrical signal and communicate the electrical signal to the computing device 104. The computing device 104 can compare values of a plurality of audio parameters associated with the recording to target values of the plurality of audio parameters. Based on the comparison, the computing device 104 can generate a report 120, as is further described herein.

The report 120 can be generated by the computing device 104 after comparing the values of the audio parameters to target values of the audio parameters to determine how the public address system 106 performed against how the public address system 106 was intended to perform. As used herein, the term "report" refers to an account of a particular matter in textual and/or graphical form. For example, the report 120 can be an account of how the speakers 112 of the public address system 106 performed when a simulated event occurs.

As illustrated in FIG. 1, the report 120 can be stored at the computing device 104. However, embodiments of the present disclosure are not so limited. For example, the report 120 can be stored remotely from the computing device 104 (e.g., at the controller 114, at a remote computing device (e.g., not illustrated in FIG. 1), etc. The report 120 can include a display of the values of the plurality of audio parameters.

The report 120 can be used to modify the audio settings 116 on the controller 114. In some embodiments, the modification is made without any user input. In some embodiments, the modification is made responsive to a user input (e.g., via the computing device 104 and/or the mobile device 122). In an example, a list of proposed audio settings is provided via the user interface 124 and a selection of one of the audio settings can be made by a user. In another example, a recommendation associated with adjusting an audio setting on the controller is included in the report.

The system 100 can further include a mobile device 122. The mobile device 122 can be configured to access the computing device 104 in order to access the report 120. The mobile device 122 can access the computing device 104 via a network relationship between the computing device 104 and the mobile device 122. The mobile device 122 can display the report 120 on a user interface 124 of the mobile device 122.

Figure 2:
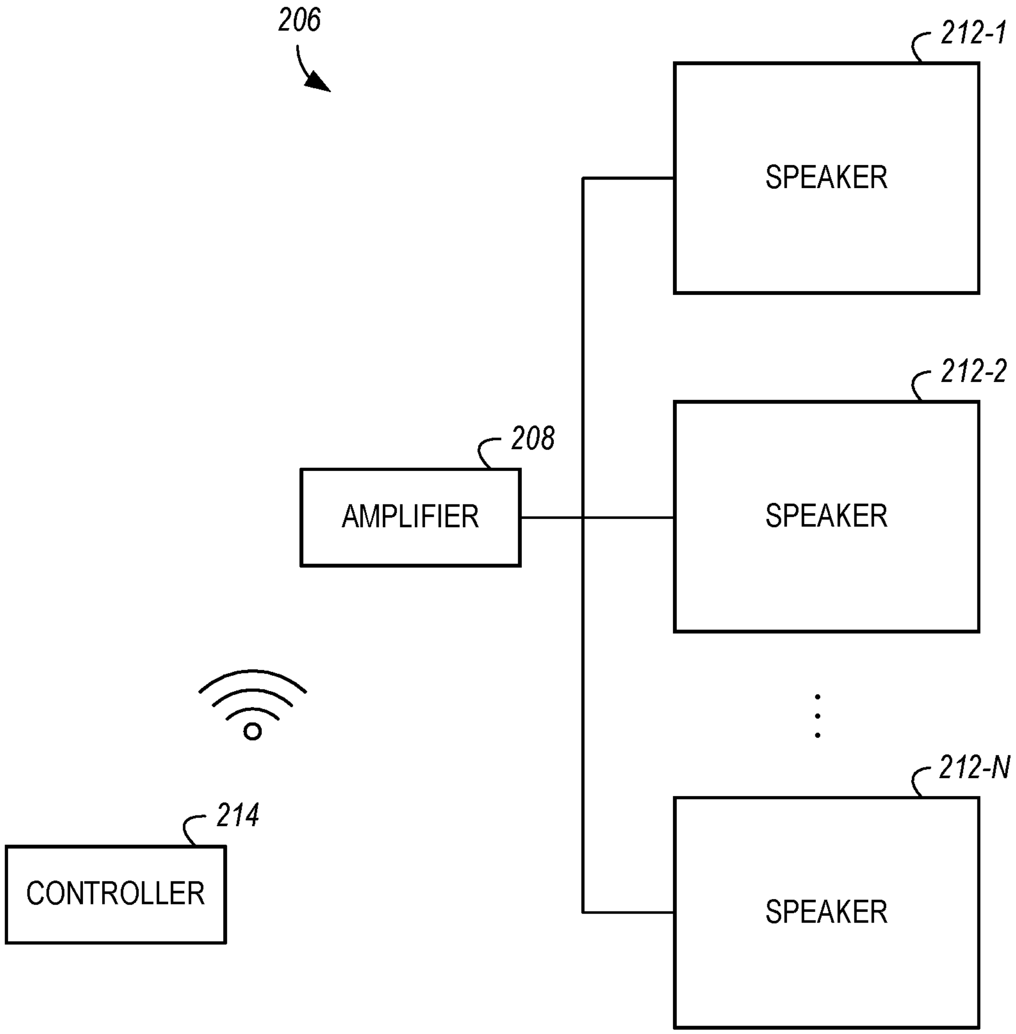
FIG. 2 is an example of a public address system in accordance with one or more embodiments of the present disclosure.

FIG. 2 is an example of a public address system 206 in accordance with one or more embodiments of the present disclosure. As illustrated in FIG. 2, the system 206 can include an amplifier 208, speakers 212-1, 212-2, 212-N, and a controller 214. As illustrated in FIG. 2, the connection between the controller 214 and the amplifier 208 is a wireless (IP) connection. The connection between the controller 214 and the speakers 212 can be a wired connection.

Figure 3:
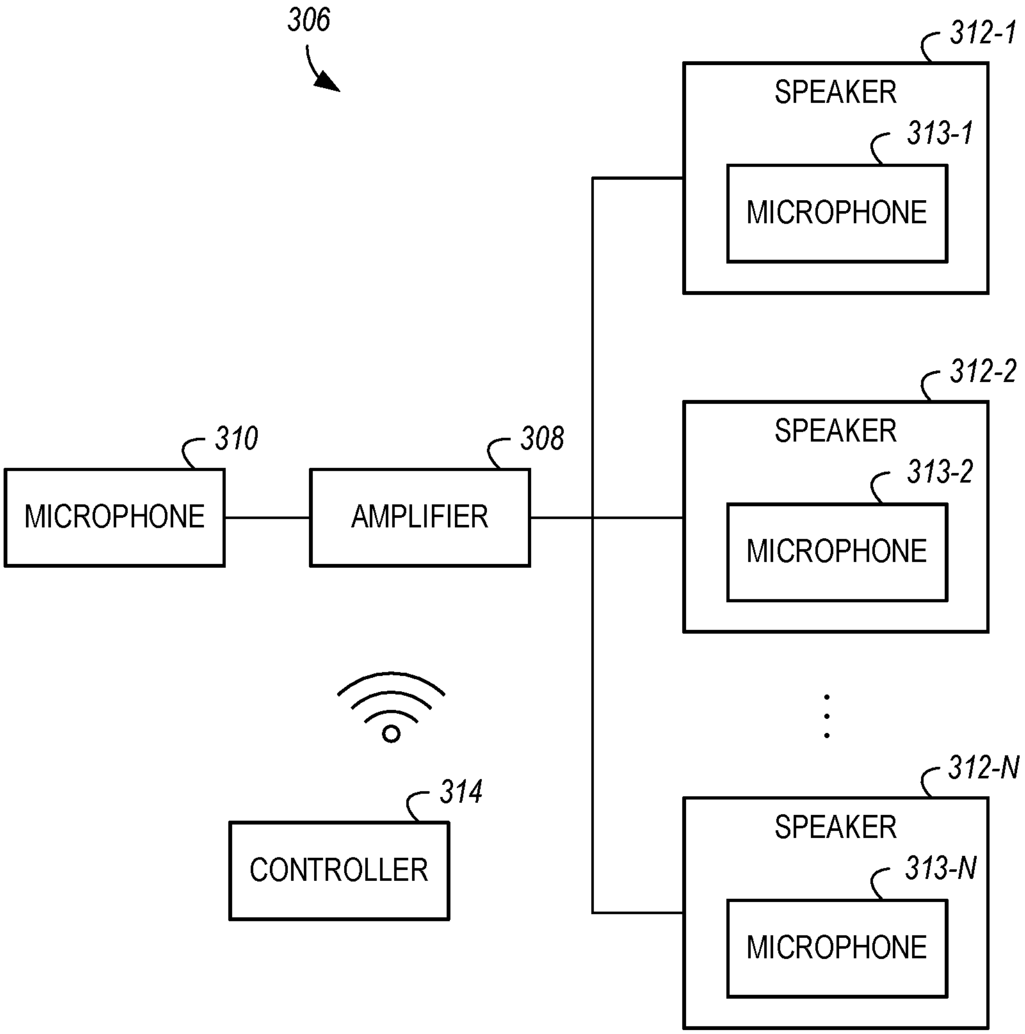
FIG. 3 is an example of a public address system in accordance with one or more embodiments of the present disclosure.

FIG. 3 is an example of a public address system 306 in accordance with one or more embodiments of the present disclosure. As illustrated in FIG. 3, the system 306 can include an amplifier 308, a microphone 310, speakers 312-1, 312-2, 312-N, and a controller 314. The microphone 310 can be accessed by a user to speak audio to be played by the speakers 312, for instance. As illustrated in FIG. 3, each of the speakers 312 can be associated with a respective microphone. For instance, the speaker 312-1 includes a microphone 313-1, the speaker 312-2 includes a microphone 313-2, and the speaker 312-N includes a microphone 313-N. In some embodiments, a speaker "being associated with" or "including" a microphone includes the speaker and the microphone being contained within a single housing. In some embodiments, microphones may be attached or affixed to speakers before installation of the speakers in the facility. In some embodiments, microphones may be attached or affixed to speakers after installation of the speakers in the facility.

In some embodiments, a microphone associated with a particular speaker can be configured to receive audio played by that speaker. For example, the microphone 313-1 can be configured to receive audio played by the speaker 312-1. In some embodiments, a microphone associated with a particular speaker can be configured to receive audio played by a different speaker. For example, the microphone 313-1 can be configured to receive audio played by the speaker 312-2 and/or 312-N.

Figure 4:
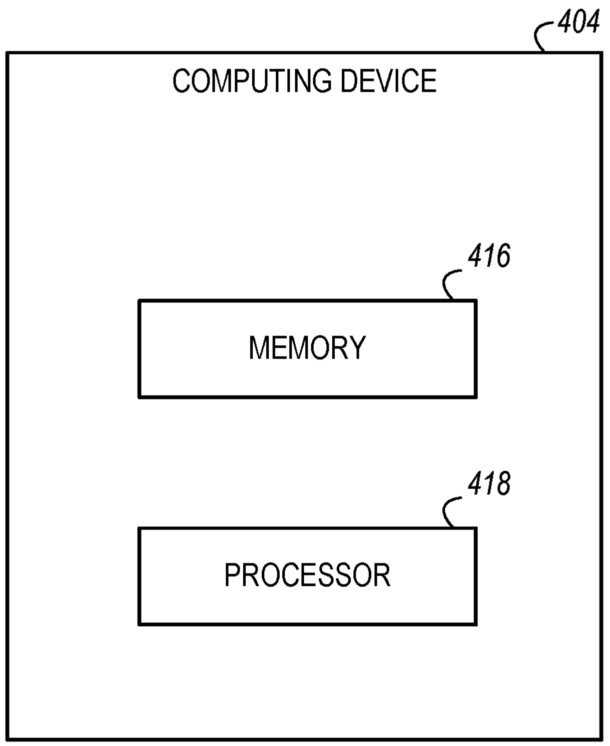
FIG. 4 is an example of a computing device for operating public address systems with IP-based amplifiers, in accordance with one or more embodiments of the present disclosure.

FIG. 4 is an example of a computing device 404 for operating public address systems with IP-based amplifiers, in accordance with one or more embodiments of the present disclosure. As illustrated in FIG. 4, the computing device 404 can include a memory 416 and a processor 418 for operating public address systems with IP-based amplifiers, in accordance with one or more embodiments of the present disclosure.

The memory 416 can be any type of storage medium that can be accessed by the processor 418 to perform various examples of the present disclosure. For example, the memory 416 can be a non-transitory computer readable medium having computer readable instructions (e.g., executable instructions/computer program instructions) stored thereon that are executable by the processor 418 for public address system commissioning in accordance with the present disclosure.

The memory 416 can be volatile or nonvolatile memory. The memory 316 can also be removable (e.g., portable)

memory, or non-removable (e.g., internal) memory. For example, the memory 416 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 416 is illustrated as being located within computing device 404, embodiments of the present disclosure are not so limited. For example, memory 416 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system, comprising:
a computing device; and
a public address system of a facility, comprising:
a controller;
a plurality of speakers; and
an amplifier located closer to each of the plurality of speakers than to the controller, on a same floor of the facility as the plurality of speakers, and in a same zone of the facility as the plurality of speakers, wherein:
the amplifier is physically separate from, and connected to, each of the plurality of speakers and wirelessly connected to the controller;
the amplifier does not include an interface for a wired connection to the controller; and
the controller is wirelessly connected to the amplifier and is configured to cause the plurality of speakers to play audio.

2. The system of claim 1, wherein the connection between the controller and the amplifier is implemented via Voice over Internet Protocol (VoIP).

3. The system of claim 1, including a redundant controller.

4. The system of claim 3, wherein the redundant controller is located remote from the facility.

5. The system of claim 4, wherein the redundant controller is cloud-based.

6. The system of claim 1, wherein the plurality of speakers are connected to a first circuit of the amplifier.

7. The system of claim 1, wherein the public address system includes another plurality of speakers connected to a second circuit of the amplifier.

8. The system of claim 1, further comprising another amplifier and another plurality of speakers connected to the other amplifier, wherein the other amplifier is wirelessly connected to the controller.

9. The system of claim 1, wherein the facility includes a plurality of zones, and wherein each zone includes a different amplifier wirelessly connected to the controller.

10. An amplifier of a public address system of a facility, comprising:
a non-transitory machine-readable medium having instructions stored thereon which, when executed by a processor, cause the processor to:
communicate via a plurality of wires with a plurality of speakers of the public address system, wherein the plurality of speakers are physically separate from the amplifier; and
communicate wirelessly with a controller of the public address system,
wherein the amplifier does not include an interface for a wired connection to the controller, wherein the amplifier is located closer to each of the plurality of speakers than to the controller, and wherein the amplifier is located on a same floor of the facility, and in a same zone of the facility, as the plurality of speakers.

11. The amplifier of claim 10, wherein the amplifier is internet protocol (IP)-enabled.

12. The amplifier of claim 10, wherein the amplifier includes a plurality of channels.

13. A method of operating a public address system, comprising:
connecting an amplifier to a plurality of speakers of a facility using a plurality of wires, wherein each of the plurality of speakers are physically separate from the amplifier, and wherein the amplifier is located on a same floor of the facility, and in a same zone of the facility, as the plurality of speakers;
establishing a wireless connection between the amplifier and a controller of the facility wherein the amplifier does not include an interface for a wired connection to the controller, and wherein the amplifier is located closer to each of the plurality of speakers than to the controller; and
amplifying, via the amplifier, a signal from the controller that causes the plurality of speakers to play audio.

14. The method of claim 13, wherein the method includes establishing another wireless connection between the amplifier and a redundant controller external to the facility.

15. The method of claim 13, wherein the method includes establishing a plurality of wireless connections between the controller and a quantity of amplifiers, wherein the quantity of amplifiers exceeds a quantity of amplifier ports of the controller.

16. The method of claim 13, wherein the method includes:

connecting each of a plurality of amplifiers to a different plurality of speakers of the facility using a respective plurality of wires, wherein the different pluralities of speakers are located on different floors of the facility;

establishing a respective wireless connection between the plurality of amplifiers and the controller; and amplifying, via the plurality of amplifiers, signals from the controller that cause the different pluralities of speakers to play audio.

* * * * *